(12) United States Patent
Nishizaki et al.

(10) Patent No.: US 6,415,212 B2
(45) Date of Patent: Jul. 2, 2002

(54) STEERING DEVICE FOR VEHICLE

(75) Inventors: Katsutoshi Nishizaki, Nabari; Shiro Nakano, Minamikawachi-gun; Takanobu Takamatsu, Habikino; Masaya Segawa, Tenri, all of (JP)

(73) Assignees: Koyo Seiko Co., Ltd., Osaka; Sumitomo (SEI) Brake Systems, Inc., Hisai, both of (JP)

( * ) Notice: Subject to any disclaimer, the term of this patent is extended or adjusted under 35 U.S.C. 154(b) by 0 days.

(21) Appl. No.: 09/764,498

(22) Filed: Jan. 17, 2001

(30) Foreign Application Priority Data

Feb. 8, 2000 (JP) ........................................ 2000-030679

(51) Int. Cl.$^7$ ................................................ B62D 6/00
(52) U.S. Cl. .............................. 701/41; 701/36; 701/70; 701/72; 701/42; 701/220; 701/91; 701/207; 701/1; 701/9; 303/140; 303/146; 303/147; 303/148; 180/197; 180/445; 180/167; 180/168; 180/443; 180/400; 340/436; 340/435; 340/465
(58) Field of Search .............................. 701/36, 70, 72, 701/42, 220, 207, 41, 96, 1, 9; 303/140, 146, 147, 148; 180/197, 445, 167, 168, 443, 400, 411, 412, 446, 415, 422; 340/438, 435, 465

(56) References Cited

U.S. PATENT DOCUMENTS

| | | | | |
|---|---|---|---|---|
| 3,805 A | * | 10/1844 | Koibuchi | ........................ 701/9 |
| 11,201 A | * | 6/1854 | Nishizaki et al. | .............. 701/41 |
| 56,317 A | * | 7/1866 | Nishizaki et al. | .............. 701/48 |
| 5,341,296 A | * | 8/1994 | Yasuno et al. | ............... 180/197 |
| 5,720,533 A | * | 2/1998 | Pastor et al. | ................. 303/140 |
| 5,762,157 A | * | 6/1998 | Uehara | ......................... 180/197 |
| 6,212,460 B1 | * | 4/2001 | Rizzo et al. | ................. 180/197 |
| 6,308,122 B1 | * | 10/2001 | Nishizaki et al. | ........... 180/410 |
| 6,325,469 B1 | * | 12/2001 | Carson et al. | ............... 303/140 |

\* cited by examiner

Primary Examiner—William A. Cuchlinski, Jr.
Assistant Examiner—Ronnie Mancho
(74) Attorney, Agent, or Firm—Jordan and Hamburg LLP

(57) ABSTRACT

In a steering device for a vehicle, the movement of a steering actuator driven by operation of an operating member is transmitted to vehicle wheels, in such a manner that the steering angle changes, without the operating member being coupled mechanically to the vehicle wheels. A first target yaw rate is calculated in accordance with the detected vehicle speed and a first steering angle set value, which corresponds to the detected amount of operation and vehicle speed. A second target yaw rate corresponding to the detected lateral acceleration and vehicle speed is calculated. A second steering angle set value, which corresponds to the difference between the detected yaw rate and a target yaw rate, as which the first target yaw rate or the second target yaw rate whichever has the smaller absolute value is taken, is calculated. The steering angle actuator is controlled in such a manner that the steering angle corresponds to the target steering angle, that is the sum of the first steering angle set value and the second steering angle set value.

4 Claims, 8 Drawing Sheets

Fig.5 ( 1 )
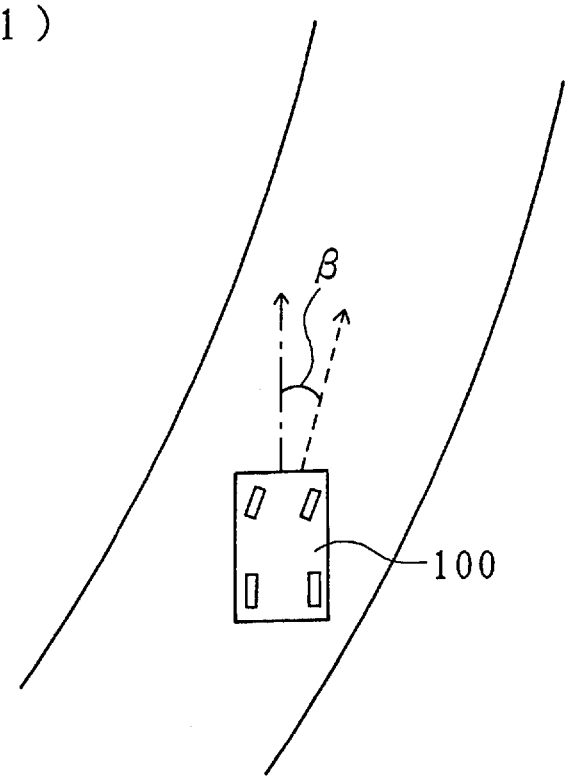
Fig.5 ( 2 )
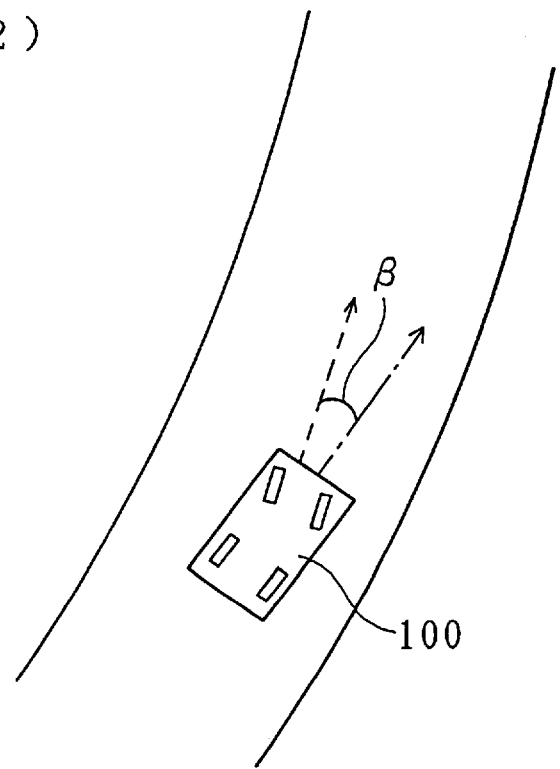

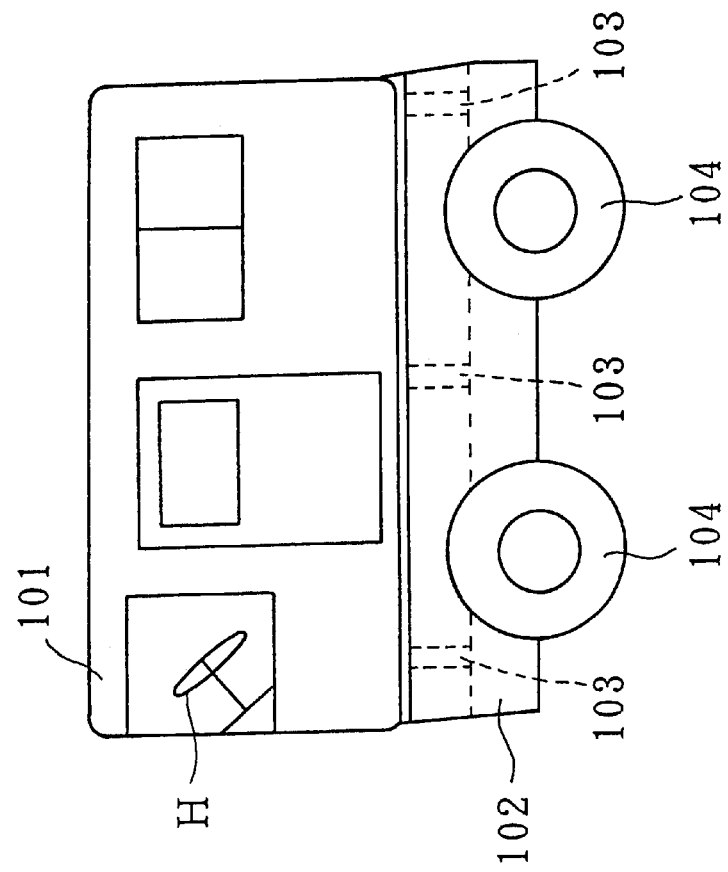
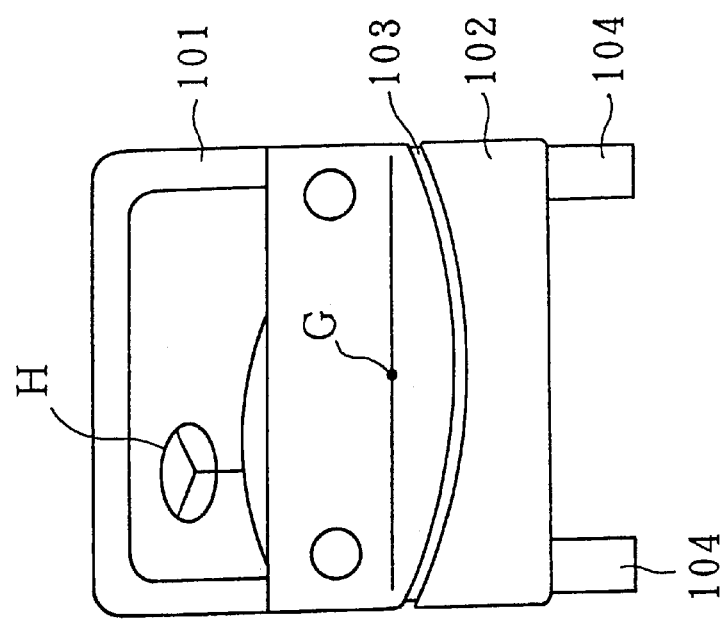
Fig. 8

STEERING DEVICE FOR VEHICLE

FIELD OF THE INVENTION

The present invention relates to a steering device for a vehicle to which a so-called 'steer by electric wire' system is applied.

DESCRIPTION OF THE RELATED ART

In a steering device for a vehicle incorporating a steer by electric wire system, the movement of a steering actuator corresponding to the operation of an operating member modelled on a steering wheel is transmitted to the wheels of the vehicle in such a manner that the steering angle changes without the operating member being coupled mechanically to the wheels. In a vehicle incorporating a steer by electric wire system of this kind, in order to stabilize vehicle behaviour, it is proposed that a target yaw rate corresponding to the amount of operation of the operation member is calculated, and the steering actuator is controlled in such a manner that this target yaw rate coincides with the actual yaw rate. Moreover, it has also been proposed that, in cases where the coefficient of friction between the road surface and the wheels of the vehicle is reduced due to freezing of the road surface, or the like, in order to prevent the vehicle behavior from becoming unstable, the braking force and driving force of the vehicle are controlled so as to eliminate the deviation between the actual yaw rate and the target yaw rate calculated in accordance with the amount of operation of the operating member and vehicle speed.

In cases where the friction of coefficient between the road surface and the wheels of the vehicle is reduced, there is a possibility that a saturated state occurs, the yaw rate of the vehicle never reaches the target yaw rate, the steering angle diverges, and the vehicle behaviour becomes unstable. Furthermore, if the control of the steering actuator interferes with the control of the braking force and driving force, it becomes impossible to stabilize the behaviour of the vehicle.

It is an object of the present invention to provide a steering device for a vehicle which is capable of resolving the aforementioned problems.

SUMMARY OF THE INVENTION

The steering device for a vehicle according to the present invention comprises: an operating member; a steering actuator driven by operation of the operating member; means for transmitting the movement of the steering actuator to the vehicle wheels, in such a manner that the steering angle changes in accordance with the movement of the steering actuator, without the operating member being coupled mechanically to the vehicle wheels; means for detecting the amount of operation of the operating member; means for detecting the vehicle speed; means for detecting the lateral acceleration of the vehicle; means for detecting the yaw rate of the vehicle; means for calculating a first steering angle set value corresponding to the detected amount of operation and vehicle speed, on the basis of a stored relationship between the amount of operation, the vehicle speed, and the first steering angle set value; means for calculating a first target yaw rate corresponding to the calculated first steering angle set value, and the detected vehicle speed, on the basis of a stored relationship between the first steering angle set value, the vehicle speed, and the first target yaw rate; means for calculating a second target yaw rate corresponding to the detected lateral acceleration and vehicle speed, on the basis of a stored relationship between the lateral acceleration, the vehicle speed, and the second target yaw rate; means for comparing the absolute value of the calculated first target yaw rate with the absolute value of the second target yaw rate; means for calculating a second steering angle set value corresponding to the difference between the detected yaw rate and a target yaw rate, as which the first target yaw rate or the second target yaw rate whichever has the smaller absolute value is taken, on the basis of a stored relationship between the difference and second steering angle set value; and means for controlling said steering actuator in such a manner that the steering angle corresponds to a target steering angle, that is the sum of the calculated first steering angle set value and second steering angle set value.

According to the constitution of the present invention, in cases where there is no change in the yaw rate even when the steering wheel is operated due to reduction in the coefficient of friction between the road surface and the vehicle wheels, the absolute value of the first target yaw rate corresponding to the amount of operation of the operating member and the vehicle speed becomes greater than that of the second target yaw rate corresponding to the detected lateral acceleration and vehicle speed. In this situation, the second steering angle set value is calculated in response to the difference between the detected yaw rate and the second target yaw rate, of which absolute value is smaller than that of the first target yaw rate. In other words, this second steering angle set value reflects the actual behaviour of the vehicle. Therefore, by taking the target steering angle as the sum of this second steering angle set value and the first steering angle set value corresponding to the amount of operation of the operating member and vehicle speed, it is possible to prevent divergence of the steering angle and hence to achieve stabilization of the vehicle behaviour.

Furthermore, in cases where there is no reduction in the coefficient of friction between the road surface and the vehicle wheels and hence the absolute value of the first target yaw rate is smaller than that of the second target yaw rate, the second steering angle set value is calculated in accordance with the differential between the first target yaw rate and the detected yaw rate, and consequently it reflects the amount of operation of the operating member operated by the driver and the vehicle speed. Therefore, by taking the target steering angle as the sum of this second steering angle set value and the first steering angle set value corresponding to the amount of operation of the operating member and vehicle speed, it is possible to cause the vehicle behaviour to change in an optimum manner in accordance with the amount of operation of the operating member and vehicle speed.

Desirably, the present invention comprises means for controlling at least one of the braking force of the vehicle wheels and the driving force of the vehicle wheels, so as to eliminate the difference between the detected yaw rate and the target yaw rate, as which the first target yaw rate or the second target yaw rate whichever has the smaller absolute value is taken.

Thereby, both the steering angle and at least one of the braking force and driving force of the vehicle are controlled so as to eliminate the deviation between the detected yaw rate and the target yaw rate, as which the first target yaw rate or the second target yaw rate whichever has the smaller absolute value is taken. Therefore, it is possible to prevent mutual interference between the control of the steering angle and the control of the braking force and/or driving force.

Desirably, the present invention comprises means for controlling the output of the engine generating driving force for the vehicle, so as to eliminate the difference between the first target yaw rate and the detected yaw rate.

In cases where the vehicle behavior is liable to become unstable due to reduction in the coefficient of friction between the road surface and the wheels of the vehicle, since the absolute value of the first target yaw rate is greater than that of the second target yaw rate, then the differential between the first target yaw rate and the detected yaw rate is greater than the differential between the second target yaw rate and the detected yaw rate. By controlling the engine output so as to eliminate this larger differential, the amount of suppression of the engine output is increased. Thereby, if the coefficient of friction between the road surface and the vehicle wheels is reduced, the amount of suppression of the engine output is increased, thereby making it possible to stabilize the behaviour of the vehicle.

According to the present invention, in a vehicle incorporating a steer by electric wire system, in cases where the coefficient of friction between the road surface and the vehicle wheels is reduced, it is possible to control the steering actuator in such a manner that there is no divergence in the steering angle, without interference between the control of the steering actuator and the control of the braking force and/or driving force of the wheels. Moreover, by controlling the output of the engine generating driving power for the vehicle, it is possible to provide a steering device for a vehicle whereby stabilization of vehicle behaviour can be achieved in an efficient manner.

BRIEF DESCRIPTION OF THE DRAWINGS

FIG. 5(1) is a diagram illustrating a vehicle sliding laterally in an over-steer state;

FIG. 5(2) is a diagram illustrating a vehicle sliding laterally in an under-steer state;

FIG. 8 is a diagram illustrating a vehicle constituted in such a manner that the body can roll freely with respect to the chassis.

DESCRIPTION OF THE PREFERRED EMBODIMENT

Figure 1:
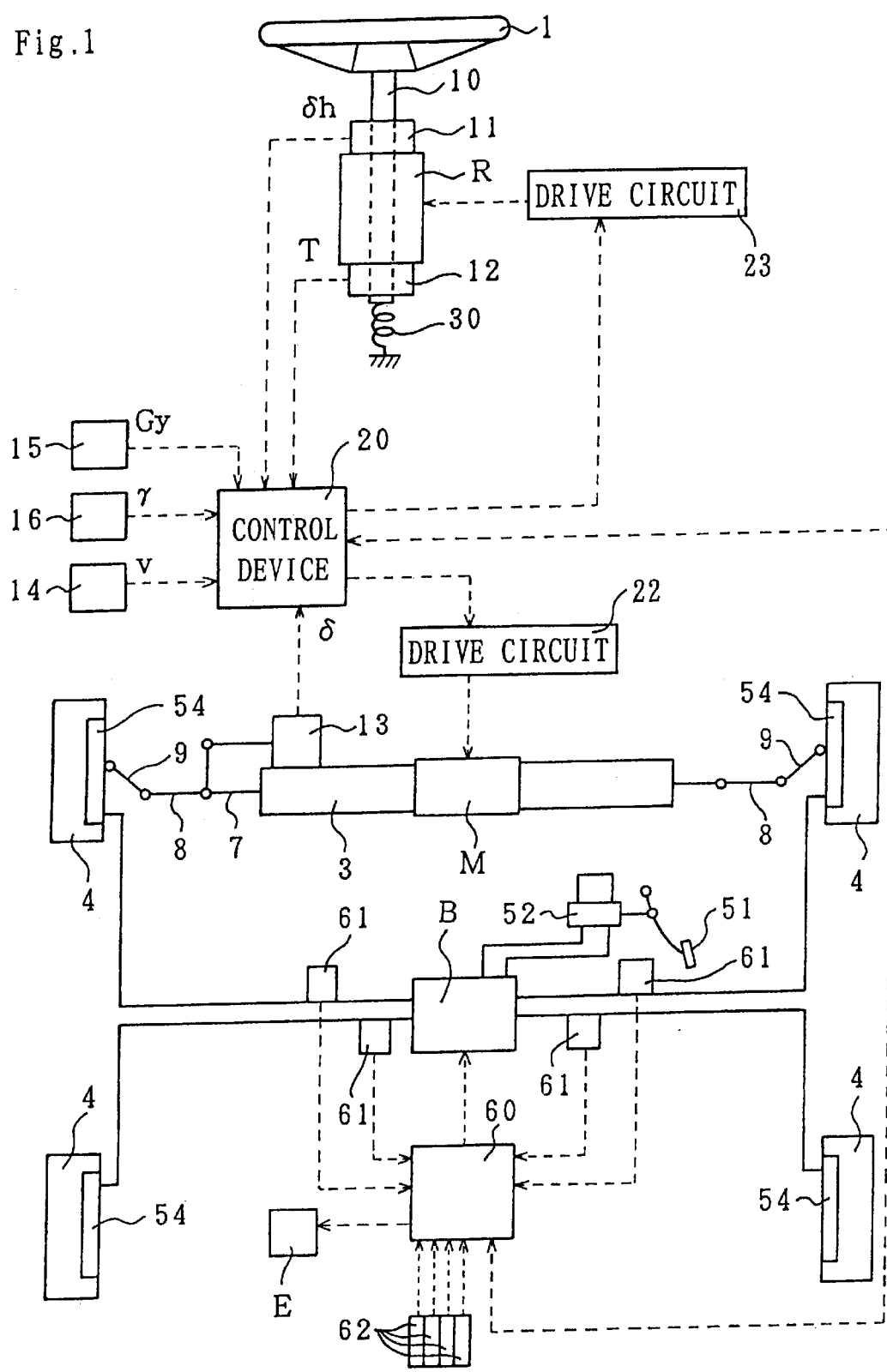
FIG. 1 is a diagram illustrating a constitution of a steering device according to an embodiment of the present invention.

The steering device for a vehicle illustrated in FIG. 1 transmits the movement of a steering actuator M driven in accordance with the rotational operation of a steering wheel (operating member) 1 to the front right and left wheels 4 of a vehicle by means of a steering gear 3, in such a manner that the steering angle changes, without the aforementioned steering wheel 1 being coupled mechanically to the vehicle wheels 4.

The steering actuator M can be comprised by an electromotive motor, such as a commonly known brushless motor, for example. The steering gear 3 has a movement converting mechanism for converting the rotational movement of the output shaft of the steering actuator M to linear movement of a steering rod 7. The movement of the steering rod 7 is transmitted to the wheels 4 of the vehicle by means of tie rods 8 and knuckle arms 9. It is possible to use a commonly known device for the steering gear 3, and there are no limitations on the constitution thereof, provided that the steering angle can be changed by movement of the steering actuator M; for example, it can be constituted by means of a nut which are driven rotationally by the output of the steering actuator M, and a screw shaft which screws into the nut and is formed integrally with the steering rod 7. The wheels alignment is set such that, the vehicle wheels 4 are able to return to a straight forward steering position due to self-aligning torque when the steering actuator M is not driven.

The steering wheel 1 is coupled to a rotational shaft 10 which is supported rotatably on the vehicle body. In order to generate a reactive force against the operation of the steering wheel 1, a reactive force actuator R is provided for applying a torque to the rotational shaft 10. This reactive force actuator R can be constituted by an electromotive motor, such as a brushless motor, having an output shaft which is united with the rotational shaft 10, for example.

There is provided an elastic member 30 for applying an elastic force to the steering wheel 1 in the direction in which the steering wheel 1 is made to return to the straight forward steering position. This elastic member 30 can be constituted, for example, by a spiral spring applying the elastic force to the rotational shaft 10. When the aforementioned reactive force actuator R applies no torque to the rotational shaft 10, the steering wheel 1 returns to the straight forward steering position, due to the aforementioned elastic force.

An angle sensor 11 is provided for detecting the operating angle corresponding to the angle of rotation of the rotational shaft 10, as the amount of operation of the steering wheel 1. Furthermore, a torque sensor 12 is provided for detecting the torque transmitted by means of the rotational shaft 10, as the operating torque of the steering wheel 1.

A steering angle sensor 13 is provided for detecting the amount of movement of the steering rod 7, as the steering angle of the vehicle. This steering angle sensor 13 can be constituted by a potentiometer.

The angle sensor 11, torque sensor 12 and steering angle sensor 13 are connected to a steering system control device 20 constituted by a computer. This control device 20 is also connected to a lateral acceleration sensor 15 for detecting the lateral acceleration of the vehicle, a yaw rate sensor 16 for detecting the yaw rate of the vehicle, and a speed sensor 14 for detecting the vehicle speed. The control device 20 controls the aforementioned steering actuator M and the reactive force actuator R by means of the drive circuits 22, 23.

A braking system for braking the front and rear, left and right-hand wheels 4 of the vehicle is also provided. This braking system generates, via a master cylinder 52, a braking hydraulic pressure corresponding to foot pressure on a brake pedal 51. This braking hydraulic pressure is amplified by a braking hydraulic pressure control unit B and distributed to brake devices 54 at the respective vehicle wheels 4, these brake devices 54 producing a braking force on the respective wheels 4. The braking hydraulic pressure control unit B is connected to a driving system control device 60 constituted by a computer. This driving system control device 60 is connected to the steering system control device 20, braking pressure sensors 61 for individually detecting the respective braking hydraulic pressures at the vehicle wheels 4, and wheel speed sensors 62 for individually detecting the respective rotational speeds of the vehicle wheels 4. The driving system control device 60 controls the braking hydraulic pressure control unit B in such a manner that the braking hydraulic pressure can be amplified and then distributed, in accordance with the rotational speeds of the respective vehicle wheels 4 as detected by the wheel speed sensors 62 and feedback values from the braking pressure sensors 61. Thereby, it is possible to control the respective braking forces at the front and rear, left and right-hand wheels 4 individually. Even in cases where the brake pedal 51 is not operated, the braking hydraulic pressure control unit B is capable of generating braking hydraulic pressure by means of an in-built pump, in accordance with a braking hydraulic pressure instruction signal from the driving system control device 60.

A throttle valve drive actuator E for the engine generating the driving force of the vehicle is connected to the driving system control device 60. It is possible to control the engine output by driving the actuator E by means of a signal from the driving system control means 60 to alter the degree of opening of the throttle valve.

Figure 2:
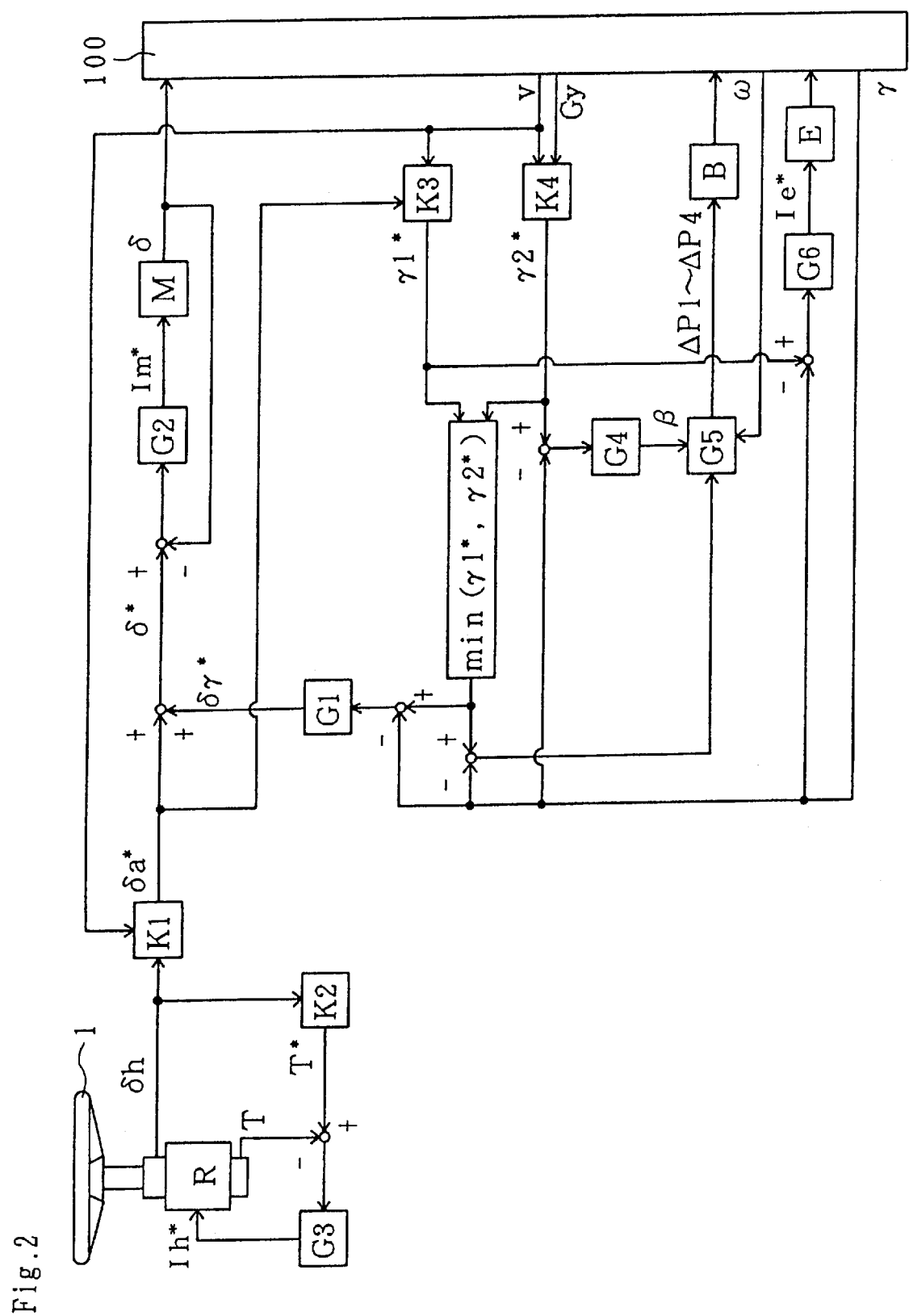
FIG. 2 is a control block diagram of the steering device according to the embodiment of the present invention.

FIG. 2 shows a control block diagram of the steering device described above. The symbols illustrated in this control block diagram are as follows:

---

$\delta h$: operating angle
$\delta$: steering angle
$\delta^*$: target steering angle
$\delta a^*$: first steering angle set value
$\delta \gamma^*$: second steering angle set value
$\beta$: lateral slip angle of vehicle 100
T: operational torque
T*: target operational torque
$\gamma$: yaw rate
$\gamma 1^*$: first target yaw rate
$\gamma 2^*$: second target yaw rate
Gy: lateral acceleration
V: vehicle speed
$\omega$: wheel speed
Im*: target drive current for steering actuator M
Ie*: target drive current for throttle valve drive actuator E
Ih*: target drive current for reactive force actuator R
$\Delta P1, \Delta P2, \Delta P3, \Delta P4$: command braking hydraulic pressure

---

Figure 3:
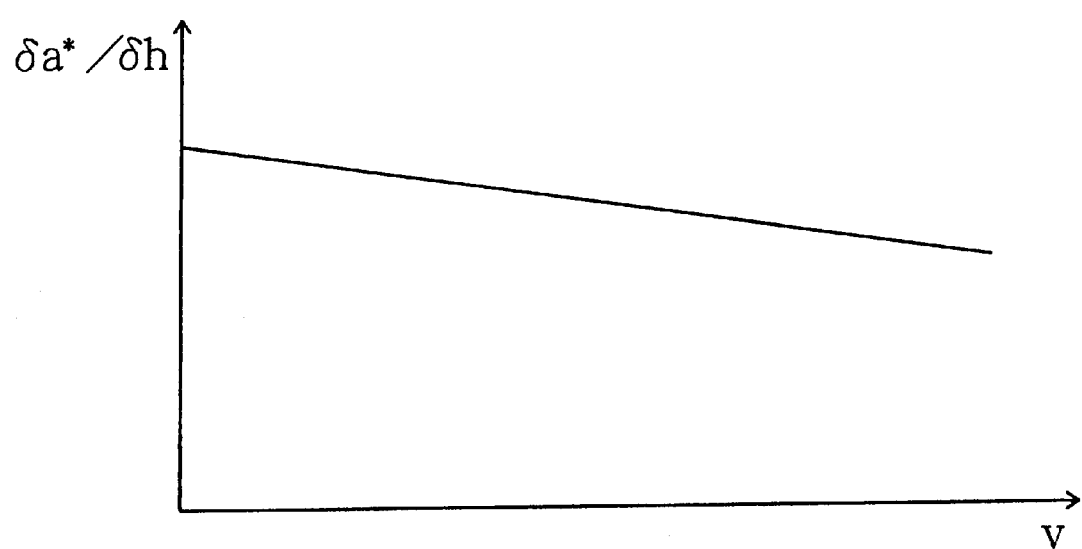
FIG. 3 is a diagram illustrating the relationship between vehicle speed and the gain of the first steering angle set value with respect to the operating angle.

Furthermore, K1 is the gain of the first steering angle set value $\delta a^*$ relative to the operating angle $\delta h$, and the first steering angle set value $\delta a^*$ is calculated from the relationship $\delta a^* = K1 \cdot \delta h$, and the detected operating angle $\delta h$. The gain K1 is a function of the vehicle speed V and is set, for example, such that it decreases as the vehicle speed increases, as illustrated in FIG. 3, in such a manner that the ratio of the yaw rate of the vehicle 100 relative to the operating angle $\delta h$ is approximately constant, regardless of the vehicle speed. In other words, the control device 20 stores a gain K1 representing a predetermined relationship between the operating angle $\delta h$, the vehicle speed V and the first steering angle set value $\delta a^*$, and hence the first steering angle set value $\delta a^*$ corresponding to the detected operating angle $\delta h$ and vehicle speed V are calculated on the basis of this relationship.

K2 is the gain of the target operational torque T* relative to the operating angle $\delta h$, and the target operational torque T* is calculated from the relationship $T^* = K2 \cdot \delta h$ and the detected operating angle $\delta h$. In other words, the control device 20 stores a gain K2 representing a predetermined relationship between the target operating torque T* and the operating angle $\delta h$, and calculates the target operational torque T* on the basis of this relationship and the detected operating angle $\delta h$. This gain K2 is adjusted in such a manner that optimum control is implemented. It is also possible to use the operational torque T instead of the operating angle $\delta h$, so that a relationship between the target operational torque T* and the operational torque T is previously determined and stored, and the target operational torque T* is calculated from this relationship and the operational torque T.

K3 is the gain of the first target yaw rate $\gamma 1^*$ relative to the first steering angle set value $\delta a^*$, and the first target yaw rate $\gamma 1^*$ is calculated from the relationship $\gamma 1^* = K3 \cdot \delta a^*$ and the first steering angle set value $\delta a^*$ calculated as described above. In the present embodiment, K3 is the steady gain of the yaw rate relative to the steering angle and is taken as $K3 = V/\{(1 + SF \cdot V^2)L\}$. Here, SF is the stability factor and L is the wheelbase, both of which are inherent values of the vehicle 100. In other words, the control device 20 stores the gain K3 representing a predetermined relationship between the first steering angle set value $\delta a^*$, the first target yaw rate $\gamma 1^*$ and the vehicle speed V, and on the basis of this relationship, the first target yaw rate $\gamma 1^*$ is calculated corresponding to the calculated first steering angle set value $\delta a^*$ and the detected vehicle speed V.

Figure 4:
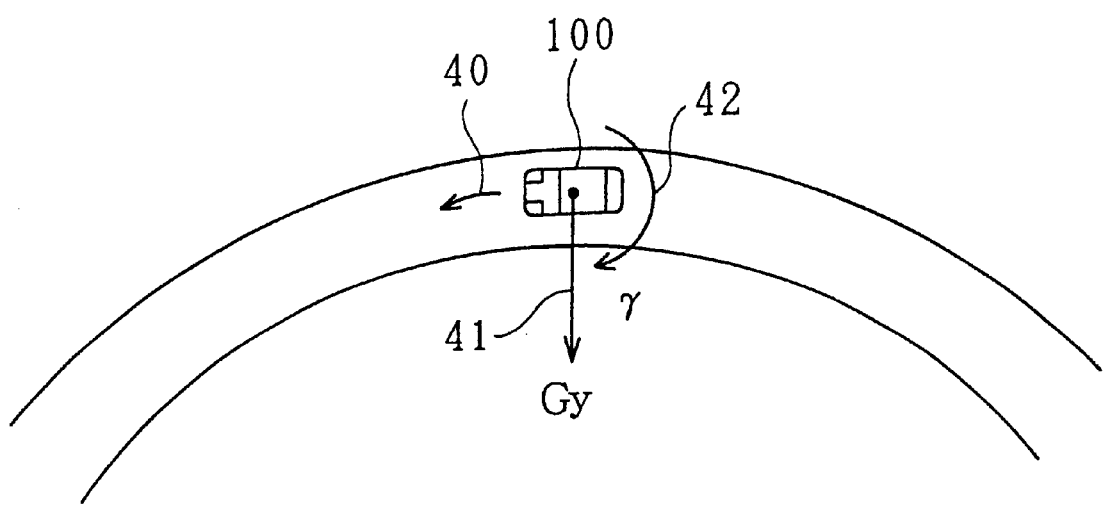
FIG. 4 is a diagram illustrating the state of a vehicle in a steady circular turning state.

K4 is the gain of the second target yaw rate $\gamma 2^*$ relative to the lateral acceleration Gy, and the second target yaw rate $\gamma 2^*$ is calculated from the relationship $\gamma 2^* = K4 \cdot Gy$ and the detected lateral acceleration Gy. In FIG. 4, the relationship between the lateral acceleration Gy acting in the direction indicated by the arrow 41 and the yaw rate $\gamma$ acting in the direction indicated by the arrow 42, in a vehicle 100 turning at a vehicle speed V in the direction indicated by the arrow 40, is given by $\gamma = Gy/V$, if the vehicle 100 is regarded as being in a steady circular turning state, and hence in the present embodiment, $K4 = 1/V$. In other words, the control device 20 stores a gain K4 representing a predetermined relationship between the second target yaw rate $\gamma 2^*$, the lateral acceleration Gy and the vehicle speed V, and on the basis of this relationship, the second target yaw rate $\gamma 2^*$ corresponding to the detected lateral acceleration Gy and vehicle speed V is calculated.

The control device 20 compares the absolute value of the calculated first target yaw rate $\gamma 1^*$ and the absolute value of the calculated second target yaw rate $\gamma 2^*$, and then calculates the differential between the detected yaw rate $\gamma$ and the target yaw rate min ($\gamma 1^*, \gamma 2^*$), as which the first target yaw rate $\gamma 1^*$ or the second target yaw rate $\gamma 2^*$ whichever has the smaller absolute value is taken.

G1 is the transfer function of the second steering angle set value $\delta \gamma^*$ relative to the differential between the target yaw rate min ($\gamma 1^*, \gamma 2^*$) and the yaw rate $\gamma$, and hence the second steering angle set value $\delta \gamma^*$ is calculated from the relationship $\delta \gamma^* = G1 \cdot \{\min (\gamma 1^*, \gamma 2^*) - \gamma\}$ and the calculated differential $\{\min (\gamma 1^*, \gamma 2^*) - \gamma\}$. If PI control is implemented, for example, and Ka is taken as the gain, s as the Laplace operator, and Ta as the time constant, then the transfer function G1 is given by $G1 = Ka[1 + 1/(Ta \cdot s)]$. The gain Ka and time constant Ta are adjusted in such a manner that optimum control is performed. In other words, the control device 20 stores a transfer function G1 representing a predetermined relationship between the differential $\{\min (\gamma 1^*, \gamma 2^*) - \gamma\}$ and the second steering angle set value $\delta \gamma^*$, and this relationship is used to calculate the second steering angle set value $\delta \gamma^*$ corresponding to the calculated differential $\{\min (\gamma 1^*, \gamma 2^*) - \gamma\}$.

G2 is the transfer function of the target drive current Im* for the steering actuator M relative to the differential obtained by subtracting the steering angle δ from the target steering angle δ*, that is the sum of the calculated first steering angle set value δa* and second steering angle set value δγ*. In other words, the target drive current Im* is determined from the relationship Im*=G2·(δa*+δγ*−δ), the calculated first steering angle set value δa*, second steering angle set value δγ*, and detected steering angle δ. If PI control is implemented, for example, and Kb is taken as the gain, s as the Laplace operator, and Tb as the time constant, then the transfer function G2 is given by G2=Kb[1+1/(Tb·s)]. The gain Kb and time constant Tb are adjusted in such a manner that optimum control is performed. In other words, the control device 20 stores a transfer function G2 representing a predetermined relationship between the target drive current Im* and the differential obtained by subtracting the detected steering angle δ from the target steering angle δ*, that is the sum of the first steering angle set value δa* and the second steering angle set value δγ*, and this relationship is used to calculate the target drive current Im* on the basis of the calculated first steering angle set value δa*, second steering angle set value δγ*, and detected steering angle δ. The actuator M is driven in accordance with the target drive current Im*. Thereby, the steering actuator M is controlled in such a manner that the steering angle δ corresponds to the target steering angle δ*.

G3 is the transfer function of the target drive current Ih* for the reactive force actuator R relative to the differential obtained by subtracting the detected operational torque T from the calculated target operational torque T*. In other words, the target drive current Ih* is determined from the relationship Ih*=G3·(T*−T), the calculated target operational torque T*, and the detected operational torque T. If PI control is implemented, for example, and Kc is taken as the gain, s as the Laplace operator, and Tc as the time constant, then the transfer function G3 is given by G3=Kc[1+1/(Tc·s)]. The gain Kc and time constant Tc are adjusted in such a manner that optimum control is performed. In other words, the control device 20 stores a transfer function G3 representing a predetermined relationship between the target drive current Ih* and the differential obtained by subtracting the operational torque T from the target operational torque T*, and this relationship is used to calculate the target drive current Ih* corresponding to the calculated target operational torque T* and the detected operational torque T. The actuator R is driven in accordance with this target drive current Ih*.

G4 is the transfer function of the lateral slip angle β of the vehicle relative to the differential between the calculated second target yaw rate γ2* and the detected yaw rate γ. In other words, the lateral slip angle β is determined from the relationship β=G4·(γ2*−γ), the calculated second target yaw rate γ2* and the detected yaw rate γ. In a vehicle 100 slipping laterally in an over-steer state as illustrated in FIG. 5(1), or a vehicle 100 slipping laterally in an under-steer state as illustrated in FIG. 5(2), if the lateral slip angle β of the vehicle is taken as the angle formed between the center line of the vehicle body as indicated by the dashed line extending in the front/back direction of the vehicle 100 and the direction indicated by the broken line in which the vehicle 100 would proceed if there were no lateral slip, then the lateral slip angle β is determined approximately by integrating (Gy/V−γ) with respect to time, that is, β=∫(Gy/V−γ)dt. Furthermore, since γ2*=K4·Gy=Gy/V as described above, then (γ2*−γ) is the differential value dβ/dt of the lateral slip angle β with respect to time. Therefore, in the present embodiment, taking s as the Laplace operator, G4 is set as 1/s, in such a manner that the integral value of (γ2*−γ) with respect to time becomes the lateral slip angle β. In other words, the control device 20 stores a transfer function G4 representing a predetermined relationship between the lateral slip angle β and the differential obtained by subtracting the detected yaw rate γ from the second target yaw rate γ2*, and this relationship is used to calculate the lateral slip angle β corresponding to the calculated second target yaw rate γ2* and the detected yaw rate γ.

G5 is the transfer function of the command braking hydraulic pressures ΔP1, ΔP2, ΔP3, ΔP4 to the front and rear, left and right-hand wheels 4 of the vehicle, relative to the differential between the calculated target yaw rate min (γ1*, γ2*) and the detected yaw rate γ. The respective command braking hydraulic pressures ΔP1, ΔP2, ΔP3, ΔP4 are determined as differentials from the braking hydraulic pressures detecting by the braking pressure sensors 61. Correlation ratios for the respective command braking hydraulic pressures ΔP1, ΔP2, ΔP3, ΔP4 are determined in accordance with the detected wheel speeds ω of the respective wheels 4. The command braking hydraulic pressures ΔP1, ΔP2, ΔP3, ΔP4 are determined from the calculated target yaw rate min (γ1*, γ2*), the detected yaw rate γ, the detected braking hydraulic pressures, and the detected wheel speeds ω, on the basis of a relationship ΔP=ΔP1+ΔP2+ΔP3+ΔP4=G5{·min (γ1*, γ2*)−γ}. This transfer function G5 can be determined in a similar fashion in cases where the vehicle braking pressures are controlled so as to eliminate the deviation between the target yaw rate and the detected yaw rate. Specifically, the control device 60 stores a transfer function G5 representing a predetermined relationship between {min (γ1*, γ2*)−γ}, the command braking hydraulic pressures ΔP1, ΔP2, ΔP3, ΔP4, the braking hydraulic pressures, and the wheel speeds ω, and this relationship is used to calculate the command braking hydraulic pressures ΔP1, ΔP2, ΔP3, ΔP4 corresponding to the calculated target yaw rate min (γ1*, γ2*), the detected yaw rate γ, the detected braking hydraulic pressures, and the detected wheel speeds ω. By supplying braking hydraulic pressure command signals corresponding to the respective command braking hydraulic pressures ΔP1, ΔP2, ΔP3, ΔP4, the braking hydraulic pressure control unit B is caused to generate braking hydraulic pressures, whereby each brake device 54 applies a braking force to the respective wheel 4. Thereby, it is possible to control the braking forces applied to the front and rear, left and right-side wheels 4 of the vehicle so as to eliminate the deviation between the yaw rate γ and the target yaw rate, as which the first target yaw rate γ1* or the second target yaw rate γ2* whichever has the lower absolute value is taken.

Furthermore, the control device 60 judges the lateral slip direction of the vehicle 100 from the sign of the calculated lateral slip angle β, and on the basis of this judgment, it determines whether or not this lateral slipping is being promoted by the braking forces applied in accordance with the calculated command braking hydraulic pressures ΔP1, ΔP2, ΔP3, ΔP4. For example, in cases where the braking force applied to the front and rear right-side wheels is greater than the braking force applied to the front and rear left-side wheels, then the vehicle 100 seeks to rotate to the right, and hence lateral slipping is promoted if the lateral slip direction is the rightward direction. The control device 60 is devised so that, if lateral slipping is being promoted in this way, then it does not output braking hydraulic pressure command signals, in such a manner that the behavior of the vehicle 100 does not become unstable.

G6 is the transfer function of the target drive current Ie* for the throttle valve drive actuator E relative to the differential between the calculated first target yaw rate γ1* and the detected yaw rate γ. In other words, the target drive current Ie* is determined from the relationship Ie*=G6·(γ1*−γ), the calculated first target yaw rate γ1*, and the detected yaw rate γ. If PI control is implemented, for example, and Ke is taken as the gain, s as the Laplace operator, and Te as the time constant, then the transfer function G6 is given by G6=Ke [1+1/(Te·s)]. The gain Ke and time constant Te are adjusted in such a manner that optimum control is performed. In other words, the control device 60 stores a transfer function G6 representing a predetermined relationship between the target drive current Ie* and the differential γy1*−γ), and this relationship is used to calculate the target drive current Ie* corresponding to the calculated first target yaw rate γ1* and the detected yaw rate γ. The throttle valve drive actuator E is driven in accordance with the signal corresponding to this target drive current Ie*. Thereby, the output of the engine generating the driving force of the vehicle 100 is controlled in such a manner that the deviation between the first target yaw rate γ1* and the yaw rate γ is eliminated.

Figure 6:
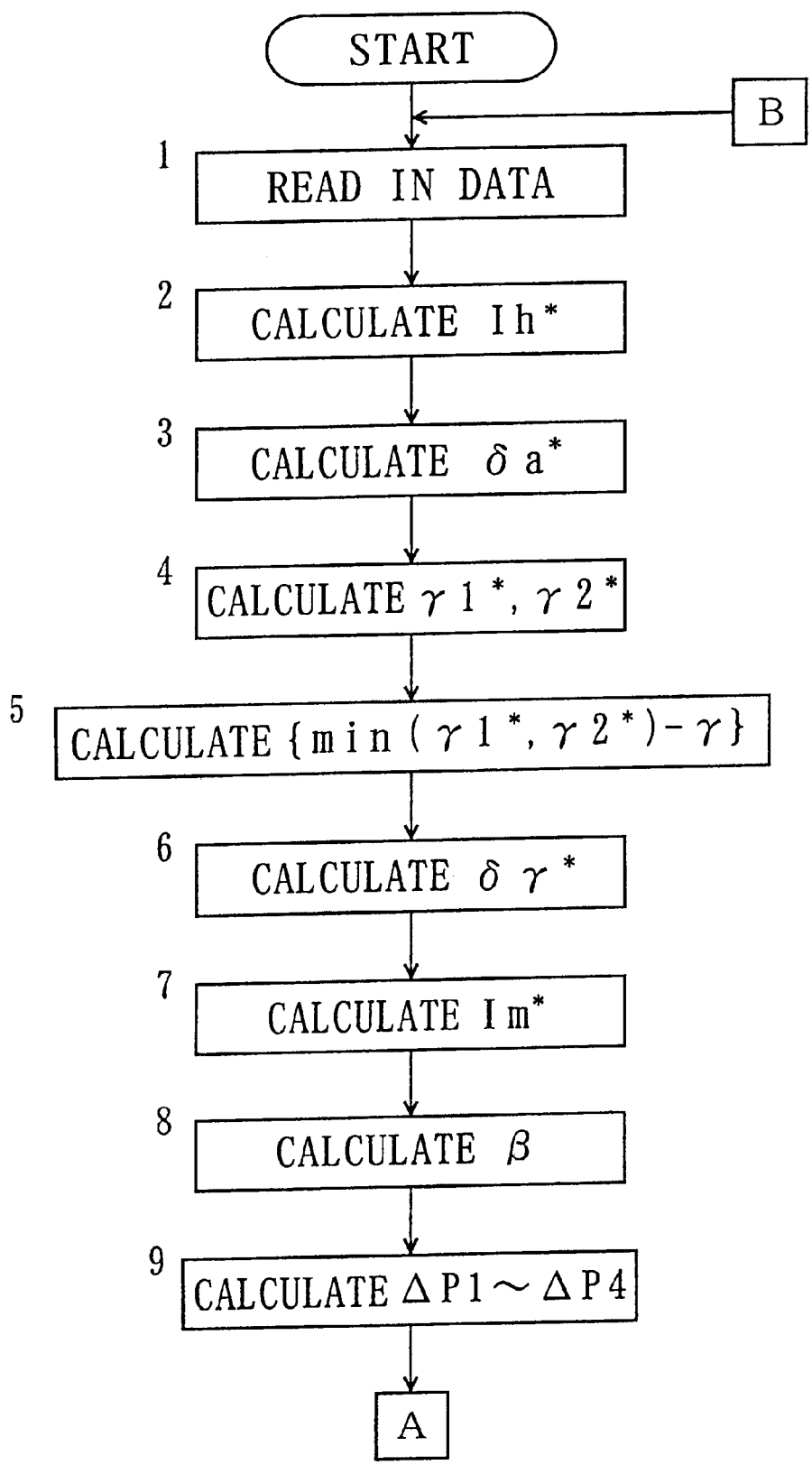
FIG. 6 is a flowchart illustrating a control procedure implemented by a steering device according to the present invention.
Figure 7:
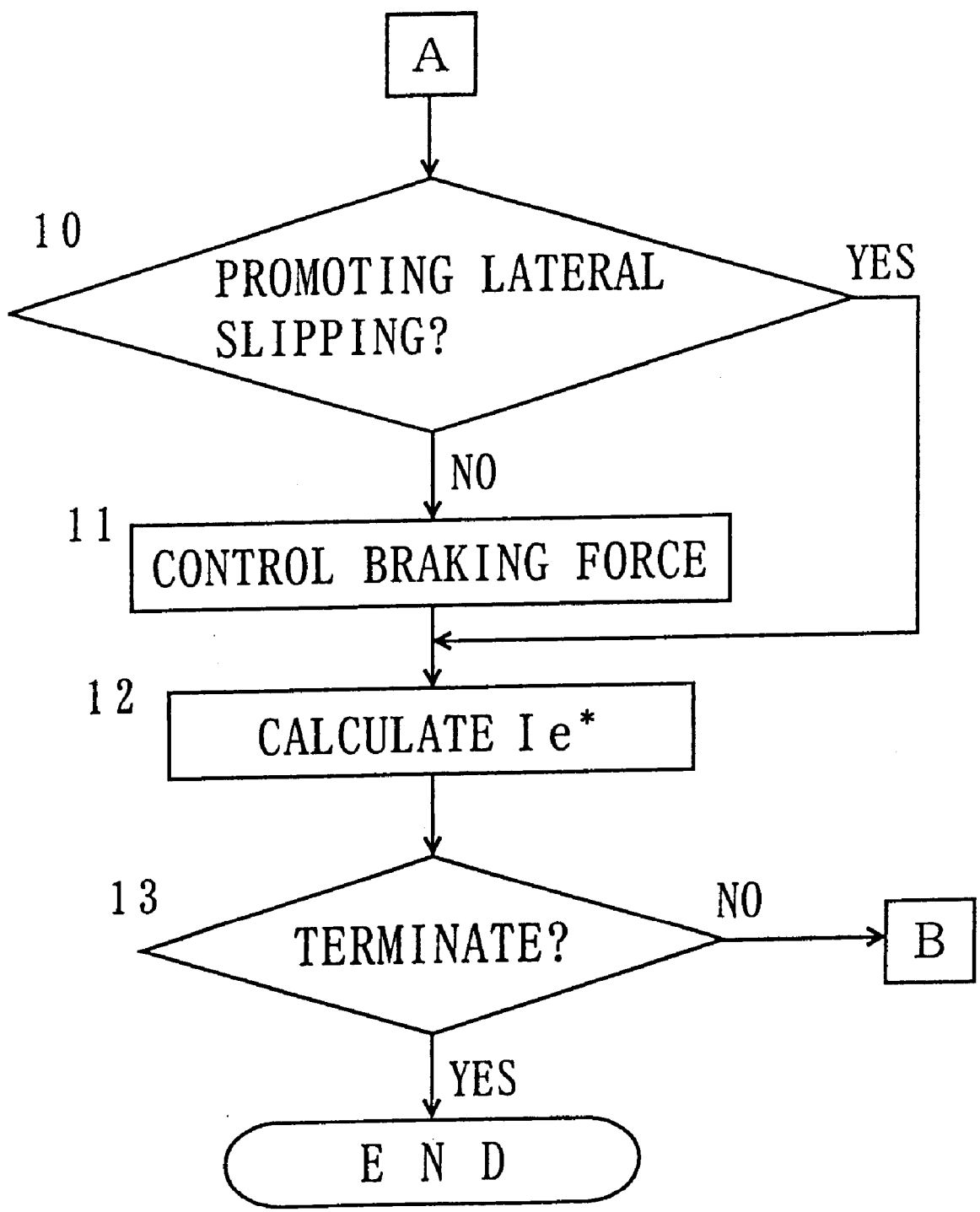
FIG. 7 is a flowchart illustrating a control procedure implemented by a steering device according to the present invention.

A control procedure implemented by the aforementioned steering device is now described with reference to the flowcharts in FIG. 6 and FIG. 7.

Firstly, detection data for the operating angle δh, operational torque T, steering angle δ, lateral acceleration Gy, yaw rate γ, vehicle speed V, braking hydraulic pressures, and wheel speeds ω, are read in from the respective sensors 11 through 16, 61 and 62 (step 1). Thereupon, the target drive current Ih* for the reactive force actuator R is determined on the basis of the transfer function G3, in such a manner that the differential, which is obtained by subtracting the operational torque T from the target operational torque T* determined in accordance with the operating angle δ on the basis of the gain K2, is eliminated (step 2). The reactive force actuator R is driven by supplying the target drive current Ih* thereto. Thereupon, the first steering angle set value δa* is determined in accordance with the operating angle δh and the vehicle speed V, on the basis of the gain K1 (step 3). The first target yaw rate γ1* corresponding to this first steering angle set value δa* and the vehicle speed V is calculated on the basis of the gain K3, and also the second target yaw rate γ2* corresponding to the lateral acceleration Gy and the vehicle speed V is calculated on the basis of the gain K4 (step 4). Thereupon, the absolute value of the first target yaw rate γ1* and the absolute value of the second target yaw rate γ2* are compared, and then the first target yaw rate γ1* or the second target yaw rate γ2* whichever has the smaller absolute value is taken as the target yaw rate min (γ1*, γ2*). Thereupon, the differential between the target yaw rate min (γ1*, γ2*) and the yaw rate γ is calculated (step 5). The second steering angle set value δγ* is calculated on the basis of this differential and the transfer function G1 (step 6). The target drive current Im* for the steering actuator M is determined on the basis of the transfer function G2, so that the differential obtained by subtracting the steering angle δ from the target steering angle δ*, that is the sum of the first steering angle set value δa* and the second steering angle set value δγ*, is eliminated (step 7). The steering actuator M is controlled by supplying this target drive current Im* thereto, so that the steering angle changes. Thereupon, the lateral slip angle β is calculated on the basis of the transfer function G4, in accordance with the differential obtained by subtracting the yaw rate γ from the second target yaw rate γ2* (step 8). The command braking hydraulic pressures ΔP1, ΔP2, ΔP3, ΔP4 are also determined on the basis of the transfer function G5, in accordance with the aforementioned differential between the target yaw rate min (γ1*, γ2*) and the yaw rate γ, the wheel speeds ω, and the braking hydraulic pressures (step 9). It is then judged whether or not the lateral slipping of the vehicle 100 in the direction as determined from the sign of the lateral slip angle β is promoted by the braking force, which is imparted on the basis of the calculated command braking hydraulic pressures ΔP1, ΔP2, ΔP3, ΔP4 (step 10). If the lateral slipping is not promoted thereby, then by supplying braking hydraulic pressure command signals corresponding to the command braking hydraulic pressures ΔP1, ΔP2, ΔP3, ΔP4, the braking hydraulic pressure control unit B controls the braking forces in such a manner that the behaviour of the vehicle is stabilized by changing the braking forces (step 11). In cases where the lateral slipping is promoted, no braking hydraulic pressure command signal is output. Next, a target drive current Ie* for the throttle valve drive actuator E is determined on the basis of the transfer function G6, in accordance with the differential obtained by subtracting the yaw rate γ from the first target yaw rate γ1* (step 12). The throttle valve drive actuator E is caused to change the opening of the throttle valve by supplying this target drive current Ie* thereto, in such a manner that the vehicle behavior is stabilized by changing the engine output. Thereupon, it is judged whether or not the control process is terminated (step 13), and if it is not terminated, then the procedure returns to step 1. Termination of the control process can be determined by judging whether or not the ignition key switch of the vehicle is on, for example.

According to the foregoing embodiment, in cases where there is no change in the yaw rate γ even when the steering wheel 1 is operated due to reduction in the coefficient of friction between the road surface and the vehicle wheels 4, the absolute value of the first target yaw rate γ1* corresponding to the operating angle δh and vehicle speed V becomes greater than that of the second target yaw rate γ2* corresponding to the detected lateral acceleration Gy and vehicle speed V. In this situation, the second steering angle set value δγ* is calculated in response to the differential between the detected yaw rate γ and the second target yaw rate γ2*, of which absolute value is smaller than that of the first target yaw rate γ1*. In other words, this second steering angle set value δγ* reflects the actual behaviour of the vehicle. Therefore, by taking the target steering angle δ* as the sum of this second steering angle set value δγ* and the first steering angle set value δa* corresponding to the detected operating angle δh and vehicle speed V, it is possible to prevent divergence of the steering angle and hence to achieve stabilization of the vehicle behaviour.

Furthermore, in cases where there is no reduction in the coefficient of friction between the road surface and the vehicle wheels 4 and hence the absolute value of the first target yaw rate γ1* is smaller than that of the second target yaw rate γ2*, the second steering angle set value δγ* is calculated in accordance with the differential between the first target yaw rate γ1* and the detected yaw rate γ, and consequently it reflects the operating angle δh and vehicle speed V. Therefore, by taking the target steering angle δ* as the sum of this second steering angle set value δγ* and the first steering angle set value δa* corresponding to the detected operating angle δh and vehicle speed V, it is possible to cause the vehicle behaviour to change in an optimum manner in accordance with the operating angle δh and vehicle speed V.

Moreover, both the steering angle and the braking force of the vehicle are controlled so as to eliminate the deviation between the detected yaw rate γ and the target yaw rate, as which the first target yaw rate γ1* or the second target yaw rate γ2* whichever has the smaller absolute value is taken. Therefore, it is possible to prevent mutual interference between the control of the steering angle and the control of the braking force.

Furthermore, in cases where the vehicle behaviour becomes unstable due to reduction in the coefficient of friction between the road surface and the wheels of the vehicle, since the absolute value of the first target yaw rate γ1* is greater than that of the second target yaw rate γ2*, then the differential between the first target yaw rate γ1* and the detected yaw rate γ is greater than the differential between the second target yaw rate γ2* and the detected yaw rate γ. By controlling the engine output by driving the throttle valve drive actuator E so as to eliminate the larger differential, the amount of suppression of the engine output is increased. Thereby, if the coefficient of friction between the road surface and the vehicle wheels 4 is reduced, the amount of suppression of the engine output is increased, thereby making it possible to stabilize the behaviour of the vehicle.

The present invention is not limited to the embodiment and modification example described above. For example, it is also possible to make the operational torque T instead of the operating angle δh correspond to the amount of operation, to previously determine and store a relationship between the first steering angle set value δa*, the detected operational torque T, and the vehicle speed V, and to calculate the first steering angle set value δa* corresponding to the detected operational torque T and vehicle speed V on the basis of this relationship. Moreover, it is also possible to control the driving force of the wheels in addition to the braking force of the wheels, or to control the driving force of the wheels instead of the braking force of the wheels, in such a manner that the differential between the detected yaw rate γ and the target yaw rate, as which the first target yaw rate γ1* or the second target yaw rate γ2* whichever has the smaller absolute value is taken, is eliminated. Furthermore, it is also possible to use a hydraulic actuator instead of the electromotive actuator as the steering actuator M. In this case, by causing the braking hydraulic pressure control unit B, which is the generating source of the braking hydraulic pressure for the vehicle wheels 4, to generate a hydraulic pressure for driving the hydraulic actuator, it is possible to simplify the overall vehicle system, and hence energy efficiency can be raised and a practicable vehicle attitude control system can be achieved.

DISCLOSURE OF USEFUL ART

In a vehicle in which a steering wheel and vehicle wheels are mechanically coupled, even if occupants in the front passenger seat or rear passenger seats notice delay or errors in the operation of the steering wheel by the driver, they cannot prevent accidents, since the operation of the steering wheel remains in the sole charge of the driver. Moreover, for inexperienced drivers, it is difficult to control the steering wheel when reversing, and this often leads to the vehicle hitting another vehicle or object, but any passenger cannot provide assistance to the driver in such a case.

In a vehicle incorporating a steer by electric wire system, the movement of a steering actuator controlled by a control device in accordance with the operation of a steering wheel by a driver in the driving seat is transmitted to the wheels of the vehicle in such a manner that the steering angle changes in accordance with the aforementioned movement, without the steering wheel being coupled mechanically to the vehicle wheels. In such a vehicle incorporating the steer by electric wire system, it is conceivable that an auxiliary steering wheel, which can be operated by an occupant sitting in a front or rear passenger seat, is provided separately to the aforementioned steering wheel, whereby the steering actuator can be controlled by the control device in accordance with the operation of this auxiliary steering wheel, also. In such a case, it is desirable for the viewpoint of providing a practicable vehicle attitude control system, that a switch, that selects which of the operation of the steering wheel and the operation of the auxiliary steering wheel is given priority, is connected to the control device, wherein the steering actuator is driven in accordance with the operation of the one selected by the switch. Alternatively, it is desirable for the viewpoint of providing a practicable vehicle attitude control system, that a function is provided for determining the suddenness of the steering operation, on the basis of the operational speed, operational torque, and the like, of the steering wheel and auxiliary steering wheel, wherein the steering actuator is driven in accordance with the operation of the one displaying the greater suddenness.

Conventionally, to improve stability during travel of a vehicle, rolling and pitching is suppressed by mounting an active suspension system in the vehicle. However, since active suspension systems are expensive, they are only fitted in cars of higher category. In vehicles which are not fitted with such active suspension systems, in particular, RV vehicles, or the like, which are high and have a high center of gravity, there is a significant tendency for the vehicle body to move in a centrifugal direction during travel, on winding roads, or the like, thereby reducing the gripping force of the tires, lowering stability during travel and also tilting the driver in the centrifugal direction and hence making it difficult for him or her to control the vehicle.

In a vehicle incorporating a steer by electric wire system, the movement of the steering actuator controlled by the control device in accordance with the operation of the steering wheel is transmitted to the vehicle wheels in such a manner that the steering angle is changed according to the aforementioned movement, without the steering wheel being coupled mechanically to the vehicle wheels. In a vehicle incorporating a brake by electric wire system, braking hydraulic pressures for the vehicle wheels are generated by means of a braking hydraulic pressure generating device controlled by a control device, in accordance with the operation of a brake pedal without the brake pedal being connected by pipes to the braking hydraulic pressure generating device. In a vehicle incorporating an acceleration by electric wire system, driving output to the vehicle wheels is generated by means of an engine controlled by the control device, in accordance with the operation of an accelerator pedal without the accelerator pedal being coupled mechanically to the engine. As illustrated in FIG. 8, in a vehicle incorporating the steer by electric wire system, brake by electric wire system, and acceleration by electric wire system, a body 101 in which a steering wheel H, brake pedal and accelerator pedal are disposed can be constituted in such a manner that it is capable of rotating in a roll direction with respect to the chassis 102, in which the steering actuator, braking hydraulic pressure generating device, and engine are disposed, by means of guide rails 103. The center of gravity is located in the body 101. Thereby, even if the body 101 rolls, the weight imparted to the respective vehicle wheels 104 hardly changes, and therefore it is possible to prevent reduction in the gripping force of the tires, and also to prevent tilting of the driver in the centrifugal direction, thereby making it possible to provide a vehicle which is easy to drive, whereby stability during travel can be improved by means of a simple and inexpensive constitution.

What is claimed is:

1. A steering device for a vehicle comprising:

an operating member;

a steering actuator driven by operation of the operating member;

means for transmitting the movement of the steering actuator to the vehicle wheels, in such a manner that a steering angle changes in accordance with the movement of the steering actuator, without the operating member being coupled mechanically to the vehicle wheels;

means for detecting an amount of operation of the operating member;

means for detecting a vehicle speed;

means for detecting a lateral acceleration of the vehicle;

means for detecting a yaw rate of the vehicle;

means for calculating a first steering angle set value corresponding to the detected amount of operation and vehicle speed, on the basis of a stored relationship between the amount of operation, the vehicle speed, and the first steering angle set value;

means for calculating a first target yaw rate corresponding to the calculated first steering angle set value and the detected vehicle speed, on the basis of a stored relationship between the first steering angle set value, the vehicle speed, and the first target yaw rate;

means for calculating a second target yaw rate corresponding to the detected lateral acceleration and vehicle speed, on the basis of a stored relationship between the lateral acceleration, the vehicle speed, and the second target yaw rate;

means for comparing an absolute value of the calculated first target yaw rate with an absolute value of the second target yaw rate;

means for calculating a second steering angle set value corresponding to a difference between the detected yaw rate and the first target yaw rate or the second target yaw rate whichever has a smaller absolute value, on the basis of a stored relationship between the difference and the second steering angle set value; and means for controlling said steering actuator in such a manner that said steering angle corresponds to a target steering angle, that is a sum of the calculated first steering angle set value and second steering angle set value.

2. The steering device for a vehicle according to claim 1, further comprising means for controlling at least one of a braking force of the vehicle wheels and a driving force of the vehicle wheels, so as to eliminate the difference between the detected yaw rate and the first target yaw rate or the second target yaw rate whichever has the smaller absolute value.

3. The steering device for a vehicle according to claim 1, further comprising means for controlling an output of the engine generating driving force for the vehicle, so as to eliminate the difference between the first target yaw rate and the detected yaw rate.

4. The steering device for a vehicle according to claim 2, further comprising means for controlling an output of the engine generating driving force for the vehicle, so as to eliminate the difference between the first target yaw rate and the detected yaw rate.

* * * * *